(12) United States Patent
Kong et al.

(10) Patent No.: US 11,945,706 B2
(45) Date of Patent: Apr. 2, 2024

(54) HANDLING ROBOT

(71) Applicant: HAI ROBOTICS CO., LTD., Shenzhen (CN)

(72) Inventors: Zhe Kong, Shenzhen (CN); Qingxin Zhan, Shenzhen (CN); Yeguang Chen, Shenzhen (CN)

(73) Assignee: HAI ROBOTICS CO., LTD., Shenzhen (CN)

(*) Notice: Subject to any disclaimer, the term of this patent is extended or adjusted under 35 U.S.C. 154(b) by 349 days.

(21) Appl. No.: 17/390,667

(22) Filed: Jul. 30, 2021

(65) Prior Publication Data
US 2021/0354966 A1 Nov. 18, 2021

Related U.S. Application Data

(63) Continuation of application No. PCT/CN2020/073606, filed on Jan. 21, 2020.

(30) Foreign Application Priority Data

Feb. 1, 2019 (CN) .......................... 201920181799.7

(51) Int. Cl.
*B66F 9/20* (2006.01)
*B65G 1/04* (2006.01)
(Continued)

(52) U.S. Cl.
CPC .............. *B66F 9/20* (2013.01); *B65G 1/0492* (2013.01); *B65G 35/00* (2013.01); *B66F 9/08* (2013.01); *B66F 9/12* (2013.01)

(58) Field of Classification Search
CPC . B66F 9/20; B66F 9/08; B65G 1/0492; B65G 35/00; B65G 1/1375
See application file for complete search history.

(56) References Cited

U.S. PATENT DOCUMENTS

| 5,211,523 A | 5/1993 | Andrada Galan |
| 9,469,477 B1 | 10/2016 | Palamarchuk |

(Continued)

FOREIGN PATENT DOCUMENTS

| CN | 104875575 A | 9/2015 |
| CN | 106274334 A | 1/2017 |

(Continued)

OTHER PUBLICATIONS

International Search Report PCT/CN2020/073606.
(Continued)

*Primary Examiner* — Ronald P Jarrett
*Assistant Examiner* — Willie W Berry, Jr.
(74) *Attorney, Agent, or Firm* — J.C. PATENTS

(57) ABSTRACT

A handling robot (100), which relates to the field of warehouse logistics, comprises: a mobile chassis (10); a storage shelf (20) mounted to the mobile chassis (10), the storage shelf (20) comprising a plurality of layered plate components (21) distributed at different heights, each layered plate component (21) comprising a layered plate (210) for placing materials; a handling device (40), comprising a handling assembly (42), the handling assembly (42) being configured to handle a material to a layered plate (210) at the same height as the handling assembly (42), or to handle a material out of a layered plate (210) at the same height as the handling assembly (42); and a lift component (30), configured to drive the handling device (40) to lift relative to the storage shelf (20) so that the handling assembly (42) is at the same height as one layered plate (210).

19 Claims, 9 Drawing Sheets

(51) Int. Cl.
  *B65G 35/00* (2006.01)
  *B66F 9/08* (2006.01)
  *B66F 9/12* (2006.01)

(56) References Cited

U.S. PATENT DOCUMENTS

2009/0127864 A1    5/2009  Alvite
2017/0334644 A1*  11/2017  Otto .................... B66F 9/07
2018/0057265 A1    3/2018  Manpat

FOREIGN PATENT DOCUMENTS

| | | |
|---|---|---|
| CN | 108069180 A | 5/2018 |
| CN | 207551834 U | 6/2018 |
| CN | 108408315 A | 8/2018 |
| CN | 108408316 A | 8/2018 |
| CN | 207903268 U | 9/2018 |
| CN | 208150249 U | 11/2018 |
| CN | 208249076 U | 12/2018 |
| CN | 109264627 A | 1/2019 |
| CN | 209023571 U | 6/2019 |
| CN | 209480472 U | 10/2019 |
| CN | 209522153 U | 10/2019 |
| CN | 209758195 U | 12/2019 |
| DE | 10201400753 A1 | 11/2015 |
| DE | 10201700263 A1 | 9/2018 |
| EP | 0458722 A1 | 11/1991 |
| FR | 2856622 A1 | 12/2004 |
| JP | H0428700 A | 5/1995 |
| JP | 2017141102 A | 8/2017 |
| JP | H04028700 A | 5/2018 |
| WO | WO 2019095803 A1 | 5/2019 |

OTHER PUBLICATIONS

European Search Report of EP20747755.5.
Evaluation report of utility model patent of the counterpart CN utility model patent ZL2019201817997.
First Office Action of the parallel application JP2021-544841.
First Office Action of the parallel application KR10-2021-7024808.

* cited by examiner

HANDLING ROBOT

CROSS-REFERENCE TO RELATED APPLICATIONS

This application is a continuation of International Application No. PCT/CN2020/073606, filed Jan. 21, 2020, which claims priority to Chinese Patent Application No. 201920181799.7, filed Feb. 1, 2019, the above applications are hereby incorporated by reference in their entireties.

TECHNICAL FIELD

The present application relates to the field of intelligent warehousing, and in particular to a handling robot.

BACKGROUND

Intelligent warehousing is one of links of the logistics process, the application of intelligent warehousing ensures the speed and accuracy of data input in each link of materials warehouse management, ensures that an enterprise timely and accurately grasps real data of inventories, and reasonably maintains and controls the inventory of the enterprise. By scientific coding, it is also convenient to manage for example batches and shelf lives of inventory items. With the storage site management function of system, it is possible to timely grasp current locations of all inventory items, which is conducive to improving the working efficiency of warehouse management.

Handling robots play an important role in intelligent warehousing, and can replace manual handling of materials. However, in the process of realizing the present application, the inventor found that: current handling robots transport a small amount of materials each time.

SUMMARY

A main technical problem to be solved by embodiments of the present application is to provide a handling robot that can load a large quantity of materials.

In order to solve the above technical problem, embodiments of the present application provide the following technical solutions.

A handling robot is provided, and the handling robot includes a mobile chassis, a storage shelf, a handling device and a lift component. The storage shelf is mounted to the mobile chassis, and includes a plurality of layered plate components distributed at different heights, each layered plate component including a layered plate for placing a material. The handling device includes a handling assembly. The handling assembly is configured to handle a material to a layered plate at the same height as the handling assembly, or to handle a material out of a layered plate at the same height as the handling assembly. The lift component is configured to drive the handling device to lift relative to the storage shelf so that the handling assembly is at the same height as one layered plate.

Preferably, the mobile chassis includes a base and a driving wheel component. The driving wheel component includes a hinge bracket, a driving wheel and a shock absorber component. The hinge bracket is hinged to the base. The driving wheel is mounted to the hinge bracket and is rotatable relative to the hinge bracket, to enable the mobile chassis to move. One end of the shock absorber component is hinged to the hinge bracket and the other end of the shock absorber component is hinged to the base. The shock absorber component includes a shock absorber, and the shock absorber is configured to reduce vibration transmitted to the base via the hinge bracket.

Preferably, the shock absorber component further includes an adjusting arm. One end of the shock absorber is hinged to the hinge bracket, the other end of the shock absorber is hinged to the base; one end of the adjusting arm is hinged to the other end of the shock absorber, the other end of the adjusting arm is hinged to the base; the adjusting arm abuts against the base so that the adjusting arm is not rotatable toward a first direction relative to the base; the shock absorber enables the adjusting arm to abut against the base and provides an elastic force to prevent the adjusting arm from rotating toward a second direction relative to the base, the second direction being opposite to the first direction.

Preferably, the adjusting arm is provided with a stop portion, and the stop portion is located on a side of the adjusting arm facing the first direction.

Preferably, the adjusting arm and the shock absorber are provided at a first included angle, and an orientation of opening of the first included angle is in the same direction as the second direction; when the shock absorber is assembled, the shock absorber and the adjusting arm are arranged at a second included angle, an orientation of opening of the second included angle is in the same direction as the first direction, and lengths of two ends of the shock absorber are extendable so that the elastic force provided by the shock absorber becomes less.

Preferably, the handling device further includes a handling assembly bracket to which the handling assembly is mounted; the lift component is configured to drive the handling assembly bracket to lift relative to the storage shelf, and the handling assembly is rotatable about a vertical direction relative to the handling assembly bracket.

Preferably, the handling device further includes a rotation driving device; the rotation driving device includes a rotation driving motor, a fixed pulley, a handling assembly synchronous belt pulley and a handling assembly synchronous belt; the fixed pulley is fixedly mounted to the handling assembly bracket, the handling assembly synchronous belt pulley is rotatably mounted to the handling assembly, the handling assembly synchronous belt is connected to the handling assembly synchronous belt pulley and the fixed pulley, and the rotation driving motor is configured to drive the handling assembly synchronous belt pulley to rotate relative to the handling assembly so that the handling assembly rotates about a vertical direction relative to the handling assembly bracket.

Preferably, the fixed pulley is provided with a synchronous belt press block convex on its outer wheel face, and the synchronous belt press block abuts against the handling assembly synchronous belt so that the handling assembly synchronous belt is tensioned.

Preferably, the handling assembly is provided with a first locking hole and the handling assembly bracket is provided with a second locking hole. A locking pin can be simultaneously inserted into the first locking hole and the second locking hole so that the handling assembly cannot be rotated about a vertical direction relative to the handling assembly bracket.

Preferably, the storage shelf includes a vertical beam for supporting each layered plate component; the layered plate has two ends distributed horizontally, one end of the layered plate is close to the vertical beam and the other end of the layered plate is suspended in the air and away from the vertical beam.

Preferably, each layered plate component further includes a cross beam connected to the vertical beam; a side of the layered plate facing away from the mobile chassis is used for placing a material, the cross beam is located on the side of the layered plate facing the mobile chassis, and the cross beam is close to one end of the layered plate; the cross beam is connected to the side of the layered plate facing the mobile chassis by a plate bracket.

Preferably, each layered plate component further includes a restriction structure; the restriction structure is configured to block a material located on the layered plate.

Preferably, the restriction structure is a surrounding plate; the surrounding plate extends at an edge of the layered plate in the direction away from the mobile chassis.

Preferably, the surrounding plate includes a surrounding plate main body and a flanging body; the flanging body extends at an edge of the surrounding plate main body facing away from the layered plate, and the flanging body fits to the surrounding plate main body so that a position where the flanging body is connected to the surrounding plate main body is formed into an arc transition.

Preferably, the flanging body and the layered plate are located on the same side of the surrounding plate main body.

Preferably, each layered plate component includes a plurality of surrounding plates; an edge of the layered plate has a plurality of side edges, each surrounding plate extends on one side edge of the layered plate, a joint structure provided at a gap between each two adjacent surrounding plates; a joint structure is jointed with two adjacent surrounding plates respectively such that an arc-shaped corner is formed at a corner of the two adjacent surrounding plates.

Preferably, the joint structure has two slots; side edges of the two adjacent surrounding plates are respectively embedded in the two slots.

Preferably, the layered plate is fixedly connected to the joint structure by a screw.

Preferably, the storage shelf further includes a vertical beam, the vertical beam is detachably connected to the mobile chassis; the lift component includes a synchronous belt pulley mechanism and a lift driving motor, the lift driving motor is configured to drive the handling device to lift relative to the storage shelf by the synchronous belt pulley mechanism; the synchronous belt pulley mechanism is mounted to the vertical beam.

Preferably, the vertical beam is provided with a mounting slot, and the synchronous belt pulley mechanism is mounted in the mounting slot.

Preferably, the vertical beam is provided with a vertical guideway, the handling device is provided with a sliding member, the sliding member is mounted to the vertical guideway; and the sliding member may move along the vertical guideway to enable the handling device to lift relative to the storage shelf.

Preferably, the vertical guideway is communicated with the mounting slot to form a closed loop; a synchronous belt of the synchronous belt pulley mechanism is located in the closed loop and the synchronous belt of the synchronous belt pulley mechanism is connected to the sliding member.

Preferably, the vertical beam is provided with a cushion at an end of the vertical guideway.

Preferably, the cushion extends into the vertical guideway and abuts against the synchronous belt of the synchronous belt pulley mechanism.

Preferably, the cushion is made of a sponge material or a rubber material.

Preferably, the lift component further includes a braking device; the braking device includes a braking disc, a guiding base and a pin; the braking disc is fixed coaxially with an active belt pulley of the synchronous belt pulley mechanism; the braking disc is provided with one or more pin holes; the guiding base is provided on the vertical beam, the guiding base is provided with a socket, the pin is inserted into the socket; the pin may move along the socket so that one end of the pin is inserted into a pin hole and neither the braking disc nor the active belt pulley is rotatable.

Preferably, the braking device further includes a cam; the cam is located on a side of the guiding base facing away from the braking disc; the other end of the pin is rotatably connected to the cam, a wheel face of the cam abuts against a side of the guiding base facing away from the braking disc so that cam drives the pin to move along the socket when the cam rotates.

Preferably, the braking device further includes a resilient member; a first retaining ring is protrudingly provided on a middle portion between two ends of the pin, a second retaining ring is protrudingly provided on a wall of the socket, the resilient member abuts between the first retaining ring and the second retaining ring, the resilient member is configured to enable the cam to abut against the guiding base and provide a pressing force for keeping the pin stationary.

Preferably, the resilient member is a compression spring; the compression spring is sheathed on the pin.

The beneficial effect of embodiments of the present application is that, in contrast to the situation of the prior art, in the handling robot of embodiments of the present application, arrangement of the storage shelf can realize that the handling robot can load a large quantity of materials.

BRIEF DESCRIPTION OF DRAWINGS

One or more embodiments are illustrated exemplarily by means of figures in the accompanying drawings corresponding thereto; these exemplary illustrations do not constitute a limitation to the embodiments, and elements having the same reference numeral in the accompanying drawings are denoted as similar elements, and the figures in the accompanying drawings do not constitute a limitation of scale unless specifically stated otherwise.

DESCRIPTION OF EMBODIMENTS

To facilitate understanding of the present application, the present application is described in more detail below in conjunction with the accompanying drawings and specific embodiments. It is noted that when an element is represented as "fixed to" another element, it may be directly on another element, or one or more intermediate elements may be present therebetween. When one element is represented as "connecting" to another element, it may be directly connected to another element, or one or more intermediate elements may be present therebetween. The terms "vertical", "horizontal", "left", "right", and similar expressions used in this specification are intended only for illustrative purpose.

Unless otherwise defined, all technical and scientific terms used in this specification have the same meaning as commonly understood by those skilled in the art to which the present application pertains. In this specification of the present application, the terms used are intended only for the purpose of describing specific embodiments and are not intended to limit the present application. The term "and/or" used in this specification includes any and all combinations of one or more of relevant enumerated items.

Figure 1:
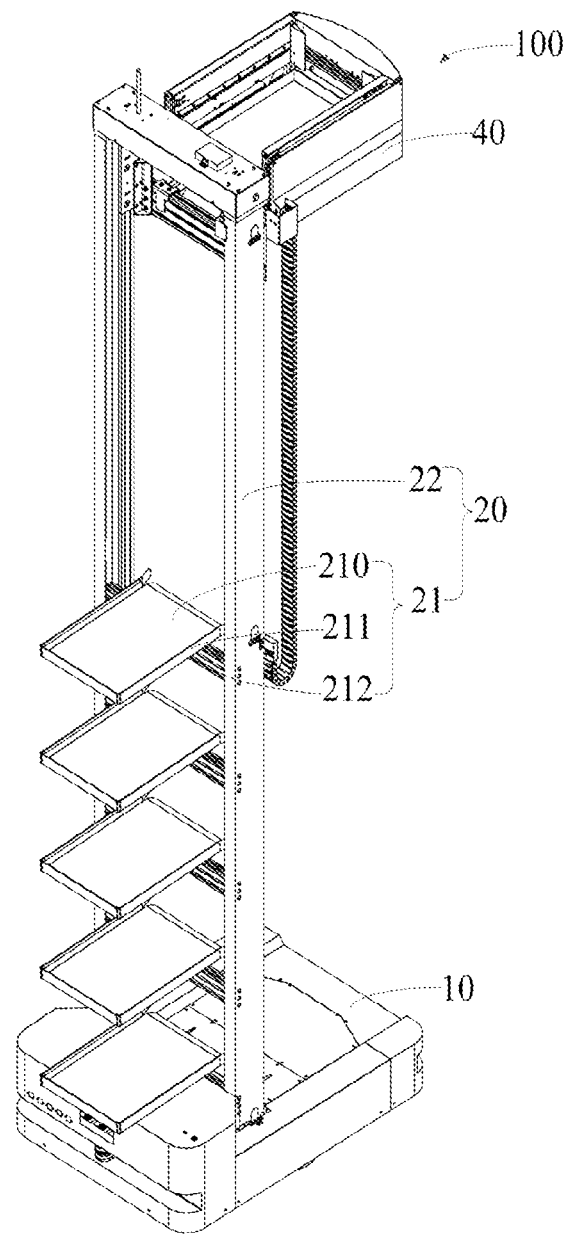
FIG. 1 is a perspective view of a handling robot provided in an embodiment of the present application.
Figure 8:
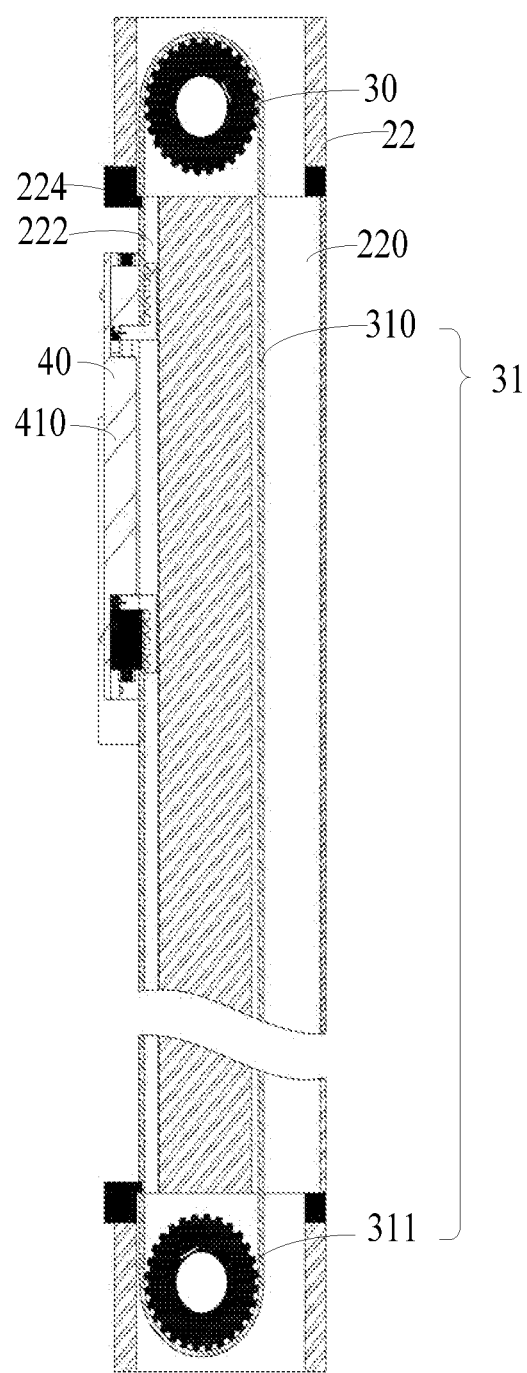
FIG. 8 is a sectional view of a lift component and a vertical beam of the handling robot shown in FIG. 1.

Referring to FIG. 1 and FIG. 8, it is a handling robot 100 provided in an embodiment of the present application; the handling robot 100 can be applied to an intelligent warehousing system, an intelligent logistics system, an intelligent sorting system, etc.; in the embodiment of the present application, the handling robot 100 applied to an intelligent warehousing system is taken as an example for detailed illustration.

The handling robot 100 includes a mobile chassis 10, a storage shelf 20, a lift component 30, and a handling device 40. Where the mobile chassis 10 carries the storage shelf 20, the lift component 30 and the handling device 40.

Figure 2:
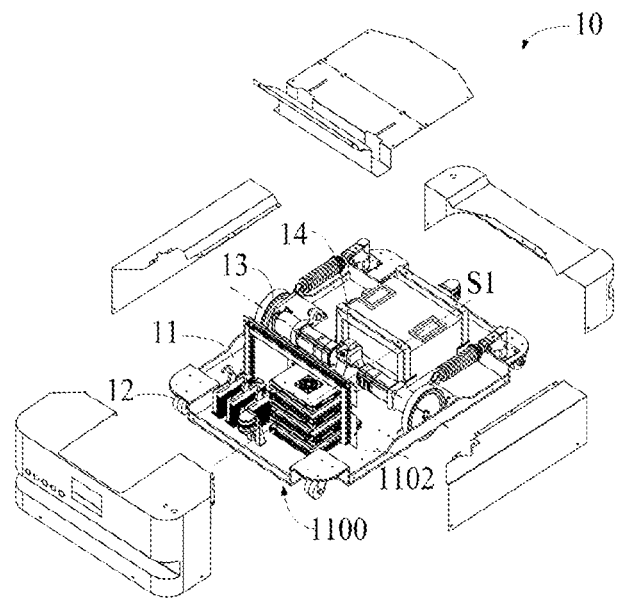
FIG. 2 is a perspective view of a mobile chassis of the handling robot shown in FIG. 1.
Figure 3:
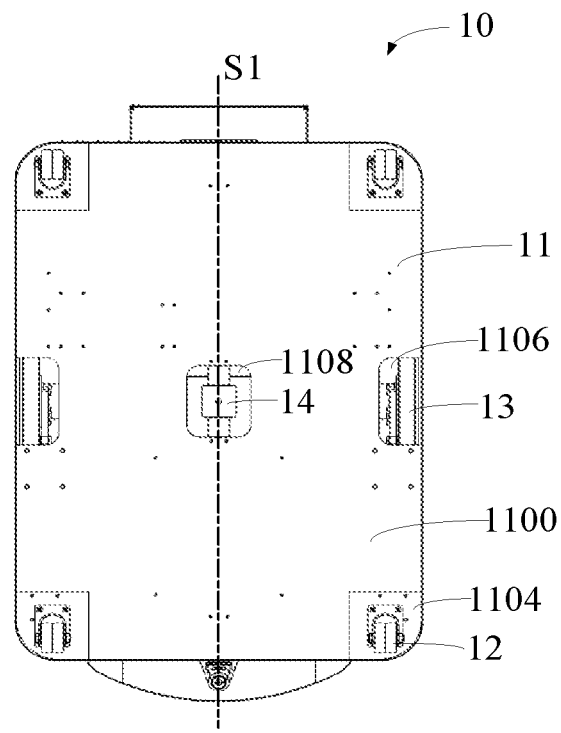
FIG. 3 is a bottom view of the mobile chassis shown in FIG. 2.

Further referring to FIGS. 2 and 3 together, the mobile chassis 10 includes, but is not limited to, application to the handling robot 100. For example, the mobile chassis 10 may be applied to an unmanned vehicle, a sweeper, a shuttle, etc.

The mobile chassis 10 is used to enable the handling robot 100 to move on the ground, the mobile chassis 10 includes a base plate 11, a driven wheel component 12, a driving wheel component 13 and a guiding device 14. Where the driven wheel component 12, the driving wheel component 13 and the guiding device 14 are each mounted to the base.

The base is assembled by welding a steel beam, a steel plate and a skin. The base includes a base plate 11, the base plate 11 is a horizontal rectangular plate member in its entirety and has a horizontal first symmetry axis S1, the base plate 11 includes a lower surface 1100 and an upper surface 1102 that are back to back, where the lower surface 1100 is toward the ground.

The base plate 11 is provided with a recessed portion 1104, a first mounting port 1106 and a second mounting port 1108. The recessed portion 1104 is located on the lower surface 1100; the recessed portion 1104 is used for mounting the driven wheel component 12. The first mounting port 1106 runs through the lower surface 1100 and the upper surface 1102, the first mounting port 1106 is used for allowing the driving wheel component 13 to pass through. The second mounting port 1108 runs through the lower surface 1100 and the upper surface 1102, and the second mounting port 1108 is used to expose the guiding device 14.

The driven wheel component 12 is a universal wheel, four driven wheel components 12 are distributed in a rectangular shape; the four driven wheel components 12 jointly support the base plate 11. It can be appreciated that, according to an actual situation, on the one hand, the driven wheel component 12 is not limited to a universal wheel, for example, the driven wheel component 12 may also be a wheel set with a steering bracket (with reference to rear wheel set of a car), as long as the driven wheel component 12 has a steering function. On the other hand, the number of the driven wheel component 12 is not limited to four, for example, the number of the driven wheel component 12 may also be three, five, six, etc., as long as the number of the driven wheel component 12 is three or more.

Two driving wheel components 13 are symmetrically distributed relative to the symmetry axis S1, and different rotational speeds between the two driving wheel components 13 makes the handling robot 100 deflect toward a side of one driving wheel component with a smaller rotational speed of the two driving wheel components 13, to realize the steering of the handling robot 100.

The driven wheel component 12 and the driving wheel component 13 jointly support the base plate 11.

Figure 4:
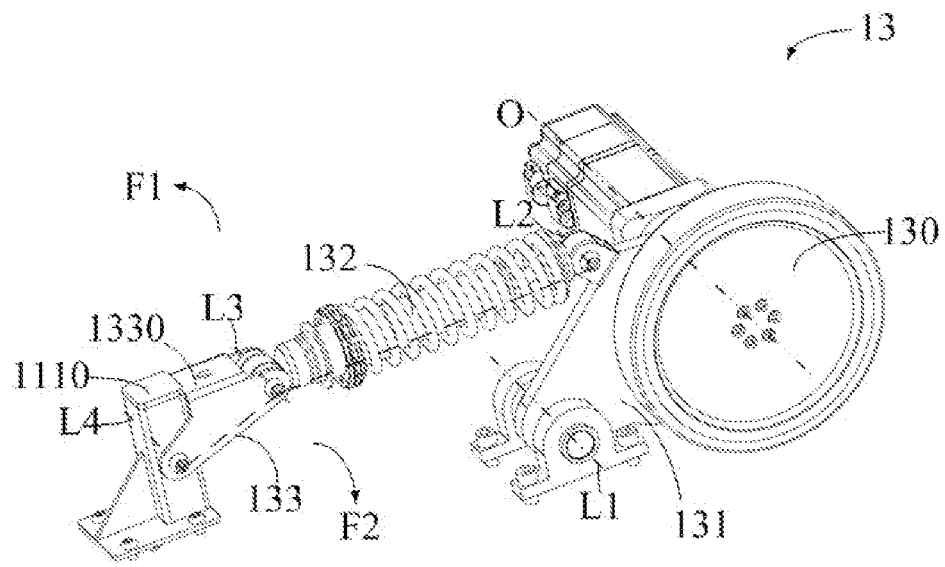
FIG. 4 is a perspective view of a driving wheel component of the mobile chassis shown in FIG. 2.

Further referring to FIG. 4, each driving wheel component 13 includes a driving wheel 130, a hinge bracket 131 and a shock absorber component. Where the driving wheel 130 is mounted to the hinge bracket 131 and the shock absorber component is mounted to the hinge bracket 131.

The driving wheel 130 has a horizontal wheel rotation axis O; the driving wheel 130 is mounted to the hinge bracket 131; the driving wheel 130 is rotatable about the wheel rotation axis O relative to the hinge bracket 131, the wheel rotation axis O is perpendicular to the first symmetry axis S1, a part of the driving wheel 130 protrudes from the lower surface 1100 of the base plate 11 through the first mounting port 1106.

It is worth noting that by providing the recessed portion 1104 for mounting the driven wheel component 12, and providing the driving wheel component 13 on a side that the upper surface 1102 faces and allowing the driving wheel component to protrude from the lower surface 1100 through the first mounting port 1106, it can realize a reduction in both clearance from ground and height of mass center of the mobile chassis 10, thereby increasing the ground grip of the mobile chassis 10, and improving the stability of movement of the mobile chassis 10.

The driving wheel 130 is driven by a driving wheel motor. Specifically, the driving wheel motor may be a servo motor, and the driving wheel motor drives the driving wheel 130 to rotate about the wheel rotation axis O relative to the hinge bracket 131. A reducer may also be provided between the driving wheel motor and the driving wheel 130, a stator of the driving wheel motor is connected to one end of housing of the reducer by a flange, a rotor of the driving wheel motor transmits torque to an input shaft of the reducer by a flat key, the other end of housing of the reducer is connected to the hinge bracket 131 by a flange, an output shaft of the reducer passes through the hinge bracket 131 and transmits torque to the driving wheel 130 by a flat key.

The hinge bracket 131 as a whole is a vertical plate member, and the hinge bracket 131 can be a single piece or an assembly assembled by several parts. This is not limited in the embodiment of the present application.

The hinge bracket 131 is hinged to the base plate 11 by a bearing seat, and the hinge bracket 131 is rotatable about a first axis L1 relative to the base plate 11. It can be appreciated that, depending on an actual situation, the bearing seat may be omitted and the hinge bracket 131 is hinged directly to the base plate 11, a position where the hinge bracket 131 is hinged to the base plate 11 is located on a side to which the upper surface 1102 is oriented.

In this embodiment, the first axis L1 is parallel to the wheel rotation axis O and the first axis L1 does not coincide with the wheel rotation axis O so that during rotation of the hinge bracket 131 about the first axis L1 relative to the base plate 11, a spacing between driving wheels 130 of two driving wheel components 13 remains constant and the movement of the mobile chassis 10 is stable.

In some other embodiments, the first axis L1 is perpendicular to the wheel rotation axis O.

One end of the shock absorber component is hinged to the hinge bracket 131, and the other end of the shock absorber 132 is hinged to the upper surface 1102 of the base plate.

The shock absorber component includes a shock absorber 132 and an adjusting arm 133 hinged to the shock absorber 132.

The shock absorber 132 is used to reduce the vibration transmitted to the base plate 11 via the hinge bracket 131. The shock absorber 132 realizes the reduction of the vibration at the two ends by compressing lengths of the two ends, one end of the shock absorber 132 is hinged to the hinge bracket 131, the shock absorber 132 is rotatable about a second axis L2 relative to the hinge bracket 131, the second axis L2 is parallel to the first axis L1 and the first axis L1 does not coincide with the second axis L2. The other end of the shock absorber 132 is hinged to the adjusting arm 133, the shock absorber 132 is rotatable about a third axis L3 relative to the adjusting arm 133, and the third axis L3 is parallel to the first axis L1.

One end of the adjusting arm 133 is hinged to the other end of the shock absorber 132, the upper surface 1102 of the base plate 11 is provided with a vertical fixing rod 1110, the other end of the adjusting arm 133 is hinged to the fixing rod 1110, the adjusting arm 133 is rotatable about a fourth axis L4 relative to the base plate 11, the fourth axis L4 is parallel to the first axis L1, the adjusting arm 133 abuts against the fixing rod 1110 so that the adjusting arm 133 is not rotatable about the fourth axis L4 relative to the base plate 11 toward a first direction F1, and the first direction F1 is in the same direction as the orientation of the upper surface 1102.

The shock absorber 132 provides abutting the adjusting arm 133 against the fixing rod 1110 and provides an elastic force to prevent the adjusting arm 133 from rotating toward a second direction F2 relative to the base plate 11, the second direction F2 being opposite to the first direction F1; the second direction F2 is in the same direction as the orientation of the lower surface 1100.

It can be appreciated that, depending on an actual situation, the fixing rod 1110 may be omitted, that is, the other end of the adjusting arm 133 is hinged directly to the base plate 11, a position where the adjusting arm 133 is hinged to the base plate 11 is located on a side to which the upper surface 1102 is oriented, the adjusting arm 133 abutting against the base plate 11, and a position where the adjusting arm 133 abuts against the base plate 11 is located on a side to which the upper surface 1102 is oriented.

The adjusting arm 133 is provided with a stop portion 1330; the stop portion 1330 is located on a side of the adjusting arm 133 facing the first direction F1.

The adjusting arm 133 and the shock absorber 132 are provided at a first included angle, the orientation of the opening of the first included angle is in the same direction as the second direction F2.

It is worth noting that, on the one hand, the working environment of the handling robot 100 is generally a warehouse with a relatively flat floor. On the other hand, the driving wheel component 13 carries only the weight within the limit of the handling robot 100, that is, during the gradual increase of the weight of the handling robot 100, the driving wheel 130 will move towards the side to which the upper surface of the base plate 11 is oriented, until the lowest point of the driving wheel 130 is at the same level as the lowest point of the driven wheel component 12, and at this time, weight of the handling robot 100 exceeding the limit will be carried by the driven wheel component 12. Thus, a rotation range of the hinge bracket 131 rotating is limited, and thus a rotation range of the shock absorber 132 rotating is also limited, so that the first included angle remains substantially unchanged.

When the shock absorber 132 is assembled, the shock absorber 132 and the adjusting arm 133 are arranged at a second included angle, the orientation of the opening of the second included angle is in the same direction as the first direction F1, and lengths of two ends of the shock absorber 132 can be elongated so that the elastic force provided by the shock absorber 132 is reduced, which may enable the shock absorber 132 to be mounted conveniently. By first making the stop portion 1330 of the adjusting arm 133 not abut against the fixing rod 1110, and mounting the two ends of the shock absorber 132 to the adjusting arm 133 and the hinge bracket 131 respectively, the shock absorber 132 can be in a natural state or slightly compressed, that is, a connection line between two ends of the shock absorber 132 and a connection line between two ends of the adjusting arm 133 are provided at a second included angle, the orientation of the opening of the second included angle is in the same direction as the first direction F1. Then the shock absorber 132 and the adjusting arm 133 are pulled towards the first direction F1, the shock absorber 132 is first compressed and then is slightly elongated, so that the stop portion 1330 of the adjusting arm 133 abuts against the fixing rod 1110. By setting the adjusting arm 133, it is not unnecessary to mount the shock absorber 132 while compressing the shock absorber 132, and the mounting of the shock absorber 132 is more convenient.

In addition, by setting the adjusting arm 133, after the shock absorber 132 is mounted, the spring tightness of the shock absorber 132 is also easy to be adjusted to adapt to the working environment of the mobile chassis, specifically, making the shock absorber 132 and the adjusting arm 133 provided at the second included angle, and at this time two ends of the shock absorber 132 are basically not under pressure, and the spring tightness of the shock absorber 132 is easy to adjust.

When the driving wheel motor stops working, the driving wheel 130 is not rotatable, so that in the case where the shock absorber 132 and the adjusting arm 133 are provided at the first included angle, the driving wheel 130 supports the chassis, and thus when the handling robot 100 is pushed by the driven wheel component 12 to a maintenance area, the driving wheel 130 will rub against the ground, preventing the handling robot 100 from moving. When the shock absorber 132 and the adjusting arm 133 are provided at the second included angle, since two ends of the shock absorber 132 are basically not under pressure, the driving wheel 130 basically does not abut against the ground, that is, the driving wheel 130 does not support the base, and the handling robot 100 can be relatively easily pushed to the maintenance area for maintenance.

It can be appreciated that, depending on the actual situation, the adjusting arm 133 may be omitted, that is, one end of the shock absorber 132 is hinged to the hinge bracket 131 and the other end of the shock absorber 132 is hinged to the base 11, as long as the driving wheel 130, the hinge bracket 131, the shock absorber 132 and the base plate 11 are connected in sequence and two ends of the shock absorber 132 are telescopic.

In comparison with the prior art, in a handling robot 100 of the embodiment of the present application and its mobile chassis 10, by setting a shock absorber component in the mobile chassis 10, the movement of the mobile chassis 10 is more stable.

The guiding device 14 is mounted to the upper surface 1102 of the base plate 11, and in this embodiment, the guiding device 14 is a camera, lens of the camera is aligned with the second mounting port 1108, and the guiding device 14 is used to identify the two-dimensional code affixed to the ground, so that the handling robot 100 travels along a preset path.

It can be appreciated that, depending on the actual situation, the guiding device 14 is not limited to a camera. For example, the guiding device 14 may also be a laser guiding device for guiding the handling robot 100 to travel along a laser beam, or, for another example, the guiding device 14 is a short-wave receiving device for achieving a guidance function by receiving a preset short-wave signal, etc.

Referring back to FIG. 1, the storage shelf 20 is mounted to the upper surface 1102 of the base plate 11.

The storage shelf 20 includes a plurality of layered plate components 21 distributed at different heights and a vertical beam 22 for supporting each layered plate component.

Each layered plate component 21 includes a layered plate 210, a restriction structure and a cross beam 214.

The layered plate 210 is used for placing a material, the layered plate 210 has two ends distributed horizontally, one end of the layered plate 210 is close to the vertical beam 22 and the other end of the layered plate 210 is suspended in the air and away from the vertical beam 22.

The restriction structure is used to block the material located on the layered plate.

In this embodiment, the restriction structure is a surrounding plate 212, the surrounding plate 212 extends at an edge of the layered plate 21 in a direction away from the mobile chassis 10, the surrounding plate 212 is used to block the material placed on the layered plate 210 to prevent the material placed on the layered plate 210 from slipping off the layered plate 210.

It can be appreciated that the restriction structure is not limited to the surrounding plate 212, and depending on the actual situation, the restriction structure may also be a columnar structure provided close to the edge of the layered plate.

Figure 5:
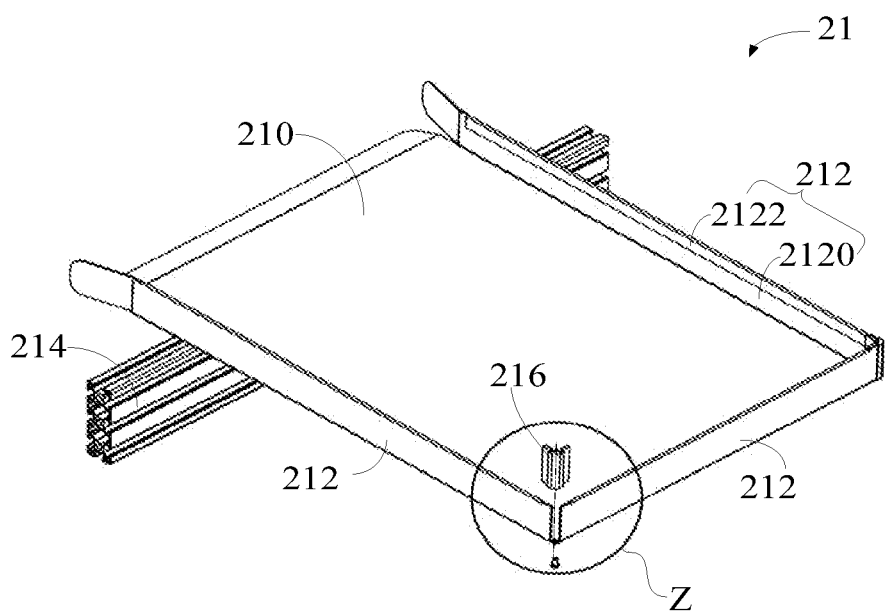
FIG. 5 is a perspective view of a layered plate component of the handling robot shown in FIG. 1.
Figure 6:
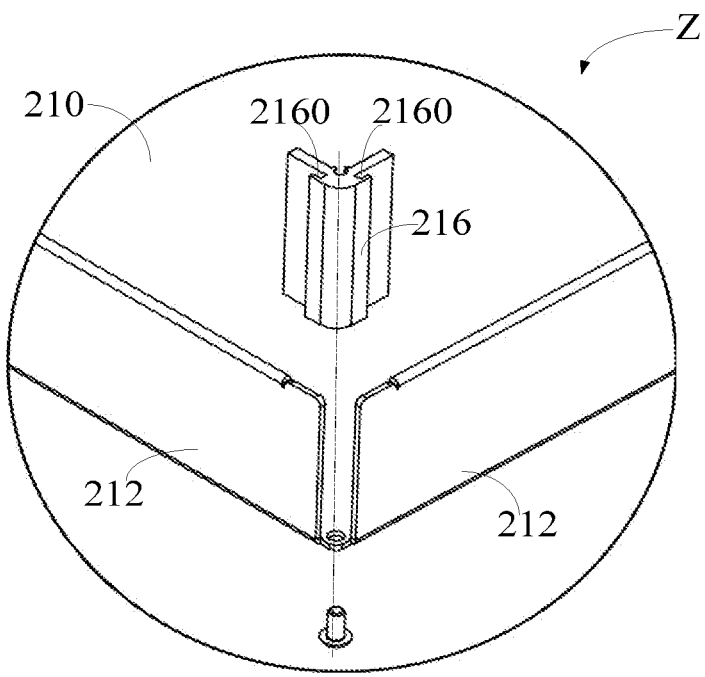
FIG. 6 is a partially enlarged view at Z shown in FIG. 5.

Referring to FIGS. 5 and 6, each layered plate component 21 includes a plurality of surrounding plates 212, the edge of the layered plate 210 has a plurality of side edges, each surrounding plate 212 extends on one side edge of the layered plate 210, a joint structure 216 is provided at a gap between each two adjacent surrounding plates 212. The joint structure 216 is jointed with two adjacent surrounding plates 212 respectively such that an arc-shaped corner is formed at a corner of the two adjacent surrounding plates 212.

The joint structure 216 has two slots 2160, side edges of two adjacent surrounding plates 212 are embedded in the two slots 2160, respectively. The joint structure 216 is fixed to the layered plate 210 by a screw.

Each surrounding plate 212 includes an surrounding plate main body 2120 and a flanging body 2122; the flanging body 2122 extends at an edge of the surrounding plate main body 2120 facing away from the layered plate 210, and the flanging body 2122 fits to the surrounding plate main body 2120 so that a position where the flanging body 2122 is connected to the surrounding plate main body 2120 is shaped into an arc transition.

The flanging body 2122 and the layered plate 210 are located on the same side of the surrounding plate main body 2120.

Figure 7:
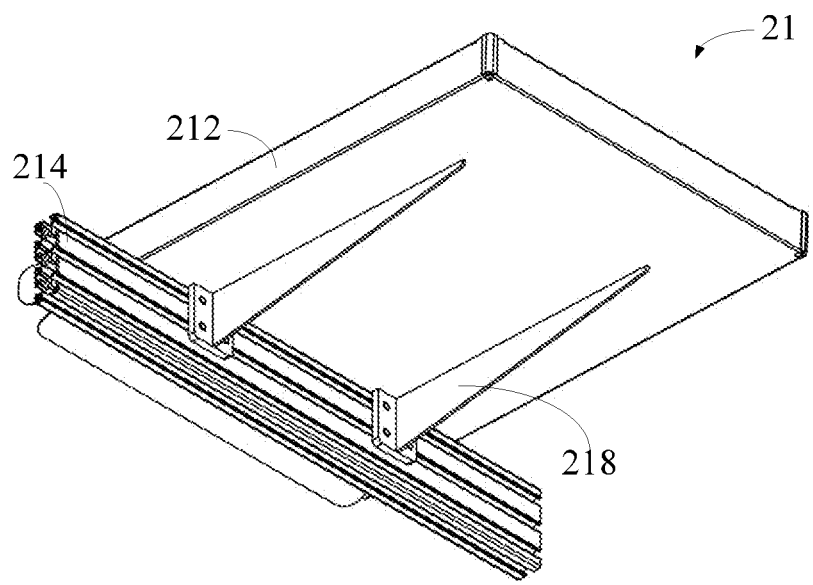
FIG. 7 is a perspective view of the layered plate component shown in FIG. 5 from another view.

Further referring to FIG. 7, a side of the layered plate 210 facing away from the mobile chassis 10 is used for placing a material, the cross beam 214 is located on a side of the layered plate 210 facing the mobile chassis 10, and the cross beam 214 is close to one end of the layered plate 210. The cross beam 214 is connected to a side of the layered plate 210 facing the mobile chassis 10 by a plate bracket 218.

Two vertical beams 22 are symmetrically distributed relative to the symmetry axis S1.

Referring to FIG. 8, the vertical beam 22 is removably connected, specifically by a bolt, to the upper surface 1102 of the base plate 11.

The vertical beam 22 is provided with a mounting slot 220 and a vertical guideway 222.

The mounting slot 220 is used for mounting the lift component 30, and the mounting slot 220 is located within the vertical beam 22.

The vertical guideway 222 is used for mounting the handling device 40, and the vertical guideway 222 is provided on a surface of the vertical beam 22. The vertical guideway 222 is communicated with the mounting slot 220, and the vertical guideway 222 and the mounting slot 220 form a closed loop.

The vertical beam 22 is provided with a cushion 224 at the end of the vertical guideway 222, the cushion 224 can be made of such material as sponge or rubber, etc.; the cushion 224 can prevent the handling device 40 from directly colliding with the vertical beam 22 when rising to the highest point or falling to the lowest point.

The cushion 224 protrudes into the vertical guideway 222 and abuts against the lift component 30.

The lift component 30 is used to drive the handling device 40 to lift relative to the storage shelf 20.

The lift component 30 includes a synchronous belt pulley mechanism 31 and a lift driving motor, the lift driving motor is used to drive the handling device 40 to lift relative to the storage shelf 20 by the synchronous belt pulley mechanism 31.

The synchronous belt pulley mechanism is mounted in the mounting slot 220, the synchronous belt 310 of the synchronous belt pulley mechanism 31 is located in the closed loop, and the synchronous belt 310 of the synchronous belt pulley mechanism 31 is connected to the handling device 40.

The lift driving motor drives an active belt pulley 311 of the synchronous belt pulley mechanism 31 to rotate through a lift driving reducer, a gear set and a transmission shaft, and depending on the actual situation, one or more of the lift driving reducer, the gear set and the transmission shaft can be omitted.

The synchronous belt 310 of the synchronous belt pulley mechanism 31 abuts against the cushion 224 so that dust does not easily enter from the vertical guideway 222 into the mounting slot 220, avoiding a power drop caused by the accumulation of dust in the synchronous belt pulley mechanism 31.

Figure 9:
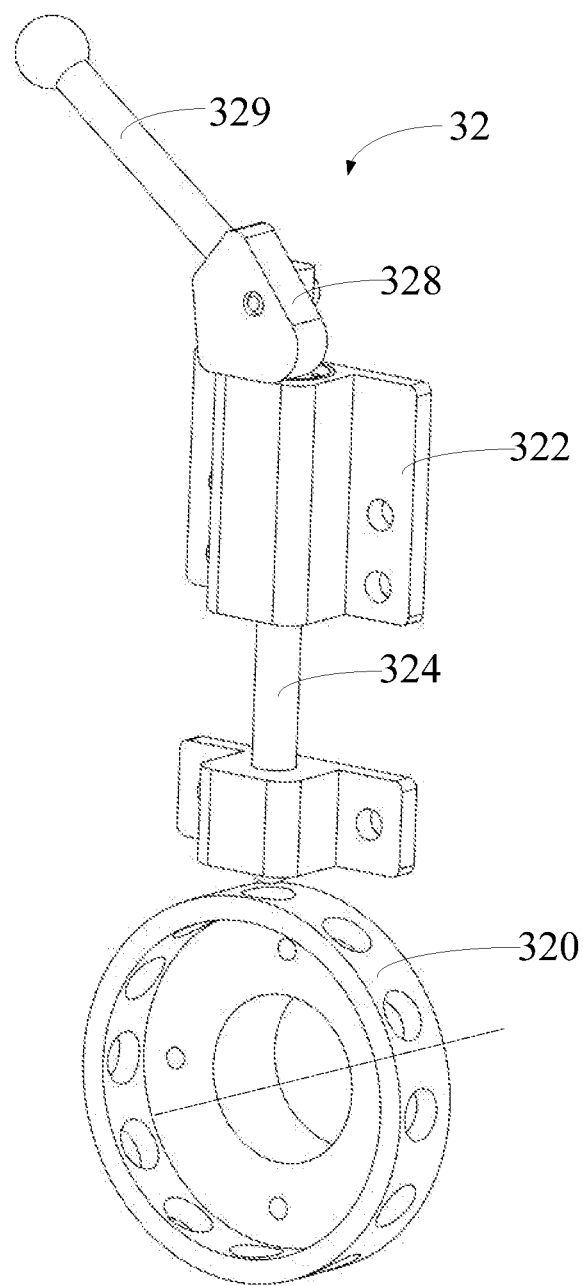
FIG. 9 is a perspective view of a braking device of the handling robot as shown in FIG. 1.
Figure 10:
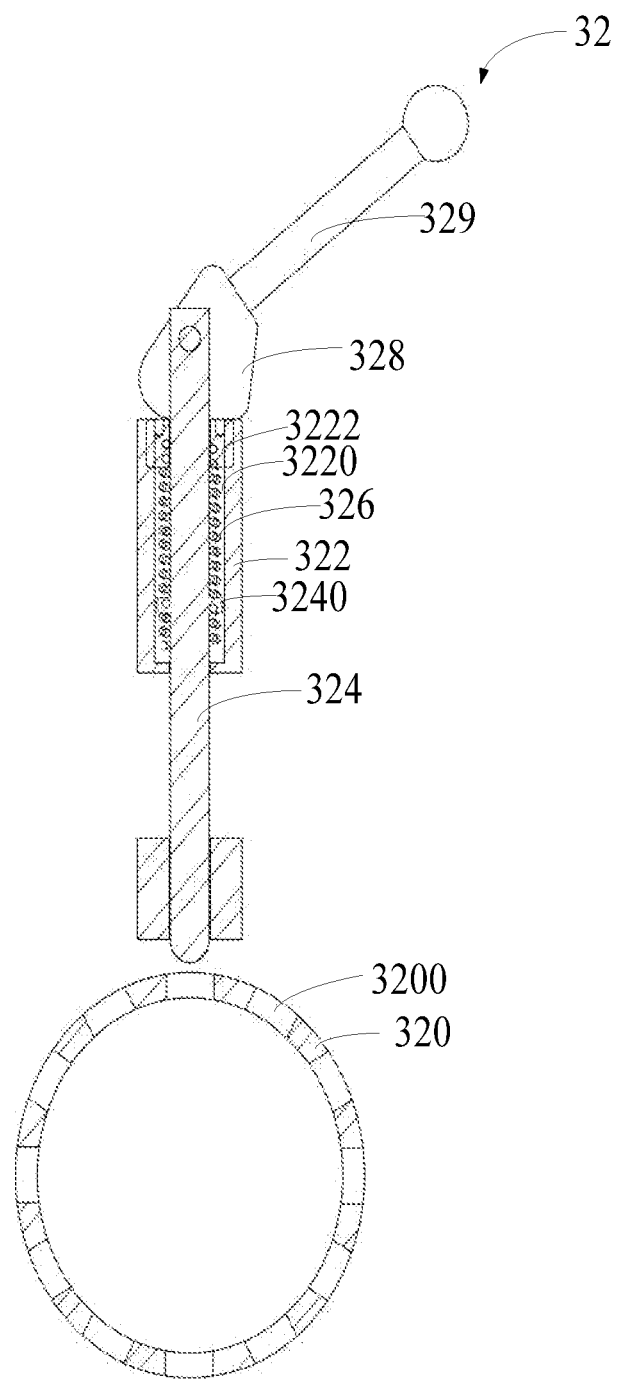
FIG. 10 is a sectional view of the braking device as shown in FIG. 9.

Referring to FIGS. 9 and 10, the lift component 30 further includes a braking device 32; the braking device 32 is used to stop the synchronous belt pulley mechanism 31 from working.

The braking device 32 includes a braking disc 320, a guiding base 322, a pin 324, a resilient member 326 and a cam 328. The braking disc 320 is provided coaxially with the active belt pulley 311 of the synchronous belt pulley mechanism 31, the braking disc 320 rotates synchronously with the active belt pulley 311 of the synchronous belt pulley mechanism 31 when the synchronous belt pulley mechanism 31 is in operation, the braking disc 320 is provided with one or more pin holes 3200, the pin holes 3200 rotates synchronously with the braking disc 320 when the braking disc 320 rotates.

The guiding base 322 is mounted to the vertical beam 22 and the guiding base 322 is provided with a socket 3220.

The pin 324 is inserted into the socket 3220, and as the braking disc 320 rotates, one end of the pin 324 can be aligned with and inserted into the pin hole 3200 to stop the braking disc 320 and the synchronous belt pulley mechanism 31 provided coaxially with the braking disc 320 from working.

The cam 328 is located on a side of the guiding base 322 facing away from the braking disc 320, the cam 328 is rotatably connected to the other end of the pin 324, the cam 328 is rotatable about its wheel center relative to the pin 324, and a wheel face of the cam 328 abuts against the side of the guiding base 322 facing away from the braking disc 320 so that the pin 324 moves along the socket 3220 relative to the guiding base 322.

The resilient member 326 is used to enable the cam 328 to abut against the guiding base 322 and provides a pressing force for keeping the pin 324 stationary, and specifically, the resilient member 326 is a compression spring, a first retaining ring 3240 is protrudingly provided on a middle portion between two ends of the pin 324, a second retaining ring 3222 is protrudingly provided on a wall of the socket 3220, the second retaining ring 3222 is located between the first retaining ring 3240 and the cam 328, the resilient member 326 is sheathed on the pin 324, and the resilient member 324 abuts between the first retaining ring 3240 and the second retaining ring 3222.

A spanner 329 is provided on the cam 328, and an operator pulls the spanner 329 to drive the cam 328 to rotate, so that the synchronous belt pulley mechanism 31 stops working. It can be appreciated that, depending on the actual situation, a cam driving motor may also be provided to drive the cam 328 to rotate so as to achieve braking of the synchronous belt pulley mechanism 31.

Figure 11:
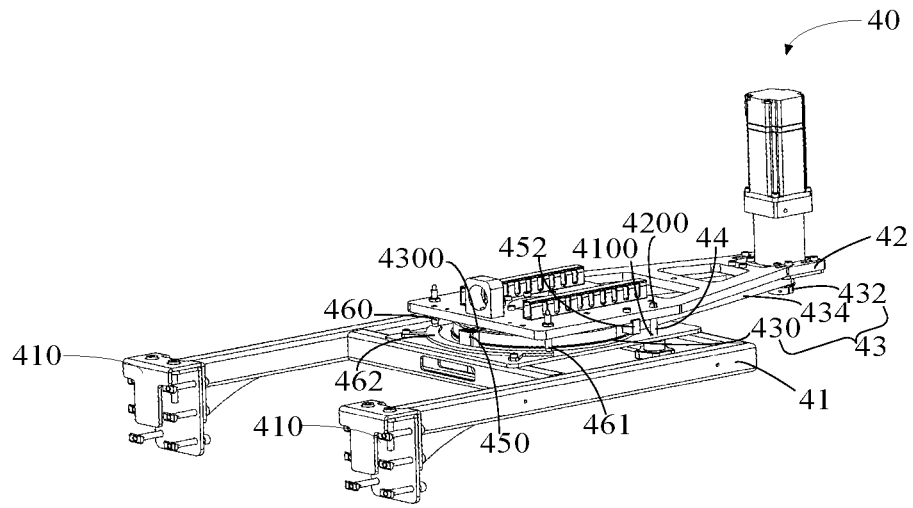
FIG. 11 is a schematic structural view of part of the handling device of the handling robot shown in FIG. 1, with part of the structure of the handling device omitted.

Referring to FIG. 11, the handling device 40 includes a handling assembly bracket 41, a handling assembly 42 and a rotation driving device 43. Where the handling assembly 42 is mounted to the handling assembly bracket 41, and the rotation driving device 43 is mounted between the handling assembly 42 and the handling assembly bracket 41.

The handling assembly bracket 41 is assembled by welding a steel beam and a steel plate, the handling assembly bracket 41 is provided with a sliding member 410, two sliding members 410 are symmetrically distributed relative to the first symmetry axis S1, the two sliding members 410 are each mounted to a corresponding vertical guideway 322, the sliding member 410 can move along the vertical guideway 322 to enable the handling device 40 to lift relative to the storage shelf 20.

The handling assembly bracket 41 is connected to the handling assembly 42 by a cross roller bearing or a cross ball bearing so that the handling assembly 42 is rotatable about a vertical direction relative to the handling assembly bracket 41. Depending on the actual situation, the handling assembly bracket 41 and the handling assembly 42 are not limited to being connected by a cross roller bearing, for example, the handling assembly bracket 41 and the handling assembly 42 may also be connected by a slewing bearing.

The rotation driving device 43 includes a rotation driving motor, a fixed pulley 430, a handling assembly synchronous belt pulley 432 and a handling assembly synchronous belt 434. A side of the handling assembly bracket 41 facing the handling assembly 42 is fixedly mounted with the fixed pulley 430, the fixed pulley 430 is coaxially provided with the cross roller bearing, the handling assembly synchronous belt pulley 432 is rotatably mounted to the handling assembly 42 about a vertical direction, the handling assembly synchronous belt 434 is connected to the handling assembly synchronous belt pulley 432 and the fixed pulley 430, the rotation driving motor is used to drive the handling assembly synchronous belt pulley 432 to rotate relative to the handling assembly 42 so that the handling assembly 42 rotates about the vertical direction relative to the handling assembly bracket 41.

The fixed pulley 430 is provided with a synchronous belt press block 4300 convex on its outer wheel face, and the synchronous belt press block 4300 abuts against the handling assembly synchronous belt 434 so that the handling assembly synchronous belt 434 is tensioned.

The handling assembly 42 is provided with a first locking hole 4200 and the handling assembly bracket 41 is provided with a second locking hole 4100, a locking pin 44 can be inserted into the first locking hole 4200 and the second locking hole 4100 simultaneously, so that the handling assembly 42 is not rotatable about a vertical direction relative to the handling assembly bracket 41.

A side of the handling assembly bracket 41 facing the handling assembly 42 is mounted with a first restriction block 450, and a side of the handling assembly 42 facing the handling assembly bracket 41 is mounted with a second restriction block 452, the first restriction block 450 is used to abut against the second restriction block 452 to enable the handling assembly 42 to rotate within a preset angle range.

The handling device 40 also includes a first angle sensor 460, a second angle sensor 461 and a controller. The first angle sensor 460 and the second angle sensor 461 are both connected to the controller.

The first angle sensor 460 is used to detect whether the handling assembly 42 rotates to be within a first preset angle range relative to the handling assembly bracket 41, and the second angle sensor 461 is used to detect whether the handling assembly 42 rotates to be within a second preset angle range relative to the handling assembly bracket 41. It is noted that the first preset angle range and the second preset angle range are both included in the preset angle range, there is an intersection between the first preset angle range and the second preset angle range and the intersection between the first preset angle range and the second preset angle range is a reference angle, and the reference angle is either a specific value or a continuous range of values.

The first angle sensor 460 and the second angle sensor 461 are both proximity switches, and the handling device 40 further includes a detection plate 462, both the first angle sensor 461 and the second angle sensor 462 are mounted to a side of the handling assembly bracket 41 facing the handling assembly 42, the detection plate 462 is mounted to a side of the handling assembly 42 facing the handling assembly bracket 41. When the first angle sensor rotates with the handling assembly 42 to be directly opposite to the detection plate 462, the first angle sensor 460 detects that the handling assembly 42 rotates to be within the first preset angle range; and when the first angle sensor 460 rotates with the handling assembly 42 to be not directly opposite to the detection plate 462, the first angle sensor 460 detects that the handling assembly 42 does not rotate to be within the first preset angle range. Similarly, when the second angle sensor 461 rotates with the handling assembly 42 to be directly opposite to the detection plate 462, the second angle sensor 461 detects that the handling assembly 42 rotates to be within the second preset angle range; and when the second angle sensor 461 rotates with the handling assembly 42 to be not directly opposite to the detection plate 462, the second angle sensor 461 detects that the handling assembly does not rotate to be within the second preset angle range. When both the first angle sensor 460 and the second angle sensor 461 are directly opposite to the detection plate 462, the handling assembly 42 rotates to be within the intersection of the first preset angle range and the second preset angle range, that is, the handling assembly 42 rotates to the reference angle.

The controller is connected to the rotation driving motor. When the first angle sensor 460 detects that the handling assembly 42 rotates to be within the first preset angle range and the second angle sensor 461 detects that the handling assembly 42 does not rotate to be within the second preset angle range, the controller controls the rotation driving motor to operate so that the handling assembly 42 rotates to be within the second preset angle range. When the first angle sensor 460 detects that the handling assembly 42 does not rotate to be within the first preset angle range and the second angle sensor 461 detects that the handling assembly 42 rotates to be within the second preset angle range, the controller controls the rotation driving motor to operate so that the handling assembly 42 rotates to be within the first preset angle range. When the first angle sensor 460 detects the handling assembly 42 rotates to be within the first preset angle range and the second angle sensor 461 detects the handling assembly 42 rotates to be within the second preset angle range, the controller controls the rotation driving motor to stop operating, and at this time the handling assembly 42 is at the reference angle.

The handling assembly 42 is used to handle a material to a layered plate 210 at the same height as the handling assembly 42, or to handle a material out of a layered plate 210 at the same height as the handling assembly 42, the handling assembly 42 may be at the same height as a layered plate 210 when the handling device 40 lifts relative to the storage shelf.

The handling assembly 42 has a horizontal second symmetry axis S2, the handling assembly 42 includes a temporary storage pallet 420, a telescopic arm 421, a fixed pusher 422 and a movable pusher 423. Where one end of the telescopic arm 421 is mounted to the temporary storage pallet 420, and both the fixed pusher 422 and the movable pusher 423 are mounted at the other end of the telescopic arm 421, where the fixed pusher 422 is mounted to one end of the temporary storage pallet 420 and is closer to the telescopic arm 421 than the movable pusher 423. The other end of the telescopic arm 421 may extend or retract along the second symmetry axis S2 relative to the temporary storage pallet 420, and drive the fixed pusher 422 and the movable pusher 423 to extend or retract. The movable pusher 423 may be expanded or folded relative to the telescopic arm 421.

Two telescopic arms 421 are symmetrically provided on two opposite sides of the second symmetry axis S2, each of two telescopic arms 421 is mounted with one movable pusher 423, and the fixed pusher 422 is connected between the two telescopic arms 421. Depending on the actual situation, the number of the telescopic arms 421 is not limited to two, and the number of the telescopic arm 421 may also be one.

Figure 12:
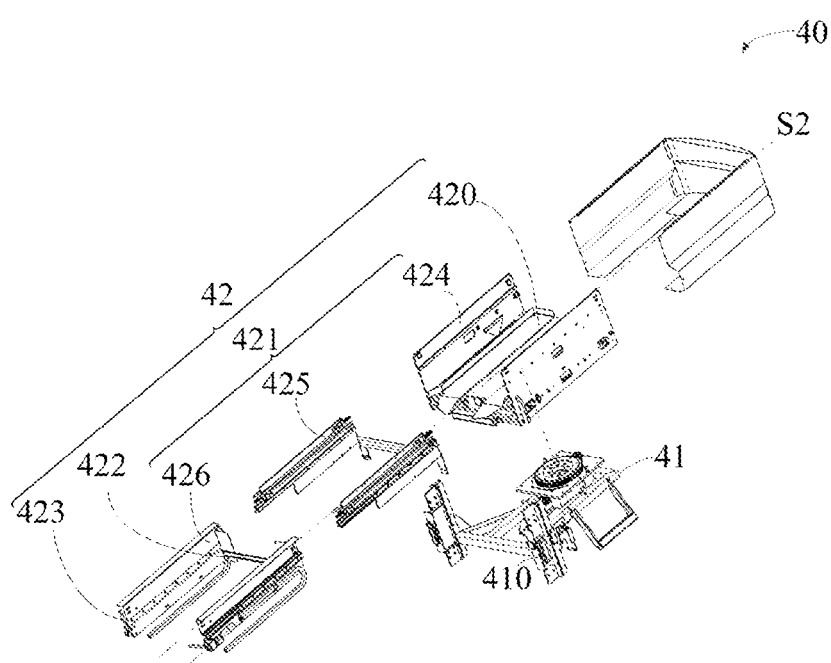
FIG. 12 is an exploded schematic view of the handling device shown in FIG. 11.

Further referring to FIG. 12, each telescopic arm 421 includes an outer section arm 424, a middle section arm 425 mounted to the outer section arm 424, and an inner section arm 426 mounted to the middle section arm 425. The outer section arm 424, the middle section arm 425 and the inner section arm 426 are disposed sequentially close to the second symmetry axis S2, the outer section arm 424 is fixedly mounted to the temporary storage pallet 420, and both the fixed pusher 422 and the movable pusher 423 are mounted to the inner section arm 426.

Figure 13:
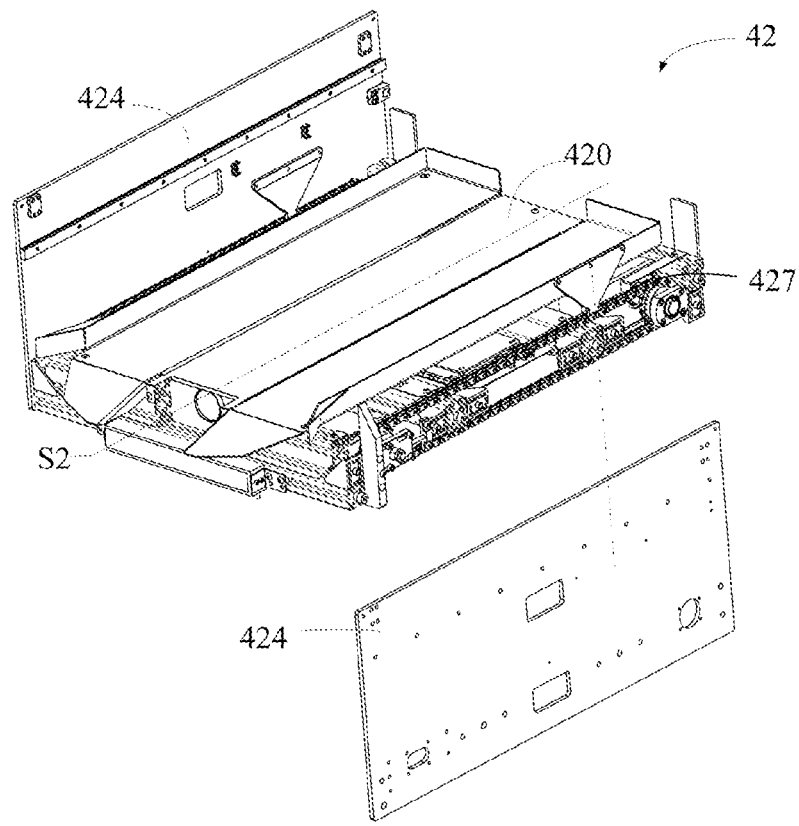
FIG. 13 is an exploded schematic view of a handling assembly of the handling device shown in FIG. 12, with part of the structure of the handling assembly omitted.

Further referring together to FIG. 13, a sprocket mechanism 427 is provided between the middle section arm 425 and the outer section arm 424, the middle section arm 425 can be driven by the sprocket mechanism 427 to extend or retract along the second symmetry axis S2 relative to the outer section arm 424.

Figure 14:
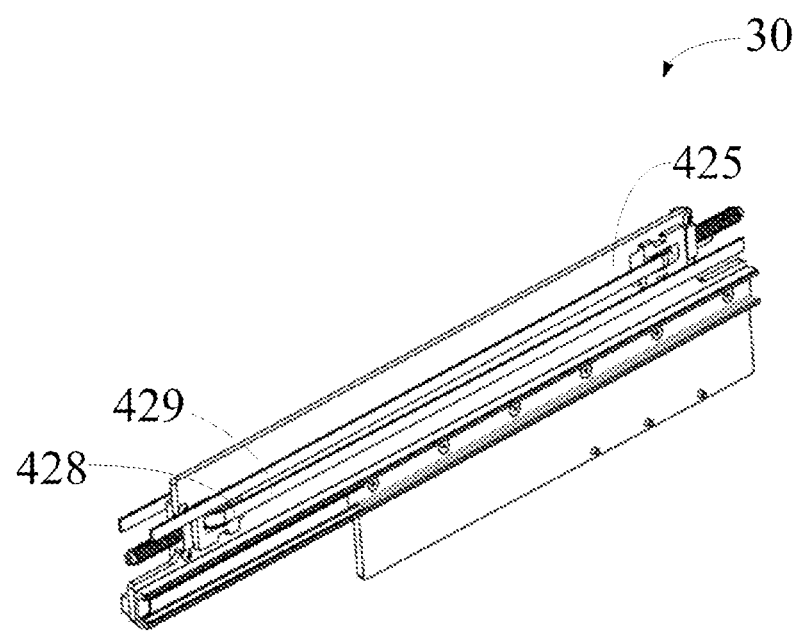
FIG. 14 is a schematic structural view of a telescopic arm of the handling assembly of the handling device shown in FIG. 12, with part of the structure of the telescopic arm omitted.

Further referring together to FIG. 14, a movable pulley mechanism is provided between the outer section arm 424, the middle section arm 425 and the inner section arm 426, the movable pulley mechanism includes a pulley 428 and a lasso 429, the pulley 428 is mounted to the middle section arm 425, the middle between two ends of the lasso 429 is bent and is sheathed on the pulley 428 so that the two ends of the lasso 429 are opposite each other, with one end of the lasso 429 being fixedly connected to the outer section arm 424, and the other end of the lasso 429 being fixedly connected to the inner section arm 426. When the middle section arm 425 extends or retracts at a first speed relative to the outer section arm 424, the inner section arm 426 extends or retracts at a second speed relative to the outer section arm 424, where the second speed is twice the first speed; by arranging a movable pulley mechanism, the inner section arm 426 can extend or retract at a fast speed, improving efficiency of the handling assembly 100 for fetching and placing a material.

The movable pusher 423 protrudes from the telescopic arm 421 in a direction close to the second symmetry axis S2 when the movable pusher 423 expands relative to the telescopic arm 421, and the movable pusher 423 substantially coincides with the telescopic arm 421 when the movable pusher 423 is folded relative to the telescopic arm 421. The movable pusher 423 is directly driven by a pusher motor, the pusher motor is used to drive the movable pusher 423 to rotate relative to the telescopic arm 421 so that the movable pusher 423 is expanded or folded relative to the telescopic arm 421. It can be appreciated that, depending on the actual situation, the way of movement of the movable pusher 423 is not limited to rotation, for example, the movable pusher 423 may move in a way of extending out of the telescopic arm 421 or retracting into the telescopic arm 421.

When the handling robot 100 performs a material loading operation, a specific working process is as follows.

The handling robot 100 moves to the vicinity of a fixed shelf on which a material to be loaded is placed; the handling robot 100 moves to be side by side with the material to be loaded; the material to be loaded is located on a layered plate 210; the lift component 30 drives the handling device 40 to lift to the same height as the layered plate 210 on which the material to be loaded is placed, and at the same time the handling assembly 42 rotates about a vertical direction so that the layered plate 210 on which the material to be loaded is placed is on the second symmetry axis S2; the movable pusher 423 is folded and the telescopic arm 421 extends so that the movable pusher 423 passes over the material to be loaded; the movable pusher 423 is expanded and the telescopic arm 421 is retracted and the movable pusher 423 pulls the material to be loaded to the temporary storage pallet 420 for temporary storage. The handling assembly 42 rotates about the vertical direction so that the storage shelf 20 is located on the second symmetry axis S2, and at this time the handling assembly 42 is located at a reference angle.

If at this time the temporary storage pallet 420 is not at the same height as any vacant layered plate 210, it is necessary to drive the handling device 40 by the lift component 30 to lift so that the temporary storage pallet 420 is at the same height as one vacant layered plate 210.

After the temporary storage pallet 420 is at the same height as a vacant layered plate 210, the telescopic arm 421 extends and the material located on the temporary storage pallet 420 is pushed by the fixed pusher 422 to one layered plate 210 at the same height as the handling device 40, and then the movable pusher 423 is folded and the telescopic arm 421 is retracted. At this time, the handling robot 100 finishes the operation of material loading.

A process of material unloading by the handling robot 100 is similar to the process of material loading, and when the handling robot 100 performs a material unloading operation, a specific working process is as follows.

The handling robot 100 moves to the vicinity of a fixed shelf on which a material to be unloaded is placed; the handling robot 100 moves to be side by side with a designated empty position on the fixed shelf; the lift component 30 drives the handling device 40 to lift to the same height as the material to be unloaded; due to that the handling assembly 42 is at a reference angle and the storage shelf 20 is located on the second symmetry axis S2, the movable pusher 423 is folded and the telescopic arm 421 is extended so that movable pusher 423 passes over the material to be unloaded; the movable pusher 423 is expanded and the telescopic arm 421 is retracted and the movable pusher 423 pulls the material to be unloaded to the temporary storage pallet 420 for temporary storage.

If at this time the handling device 40 is not at the same height as the designated empty position, it is necessary to drive the handling device 40 by the lift component 30 to lift so that the temporary storage pallet 420 is at the same height as the designated empty position.

After the temporary storage pallet 420 is at the same height as a vacant layered plate 210, the telescopic arm 421 is extended and the material to be unloaded located on the temporary storage pallet 420 is pushed by the fixed pusher 422 to the designated empty position on the fixed shelf, and then the movable pusher 423 is folded and the telescopic arm 421 is retracted.

The handling assembly rotates about the vertical direction so that the storage shelf 20 is located on the second symmetry axis S2, and at this time the handling assembly 42 is located at a reference angle. At this time, the handling robot 100 finishes the operation of material unloading.

In comparison with the prior art, in the handling robot 100 provided in the embodiment of the present application, by configuring the storage shelf 20 it can be realized that the handling robot 100 can load a large quantity of materials.

The above is only implementations of the present application, and is not intended to limit the scope of the present application. Any equivalent structure or equivalent process transformation made by using the contents of specification and accompanying drawings of the present application, or any direct or indirect application in other related technical fields, is equally included in the protection scope of the present application.

What is claimed is:

1. A handling robot, comprising:
   a mobile chassis;
   a storage shelf mounted to the mobile chassis, wherein the storage shelf comprises a plurality of layered plate components distributed at different heights, and each layered plate component comprises a layered plate for placing a material;
   a handling device comprising a handling assembly, wherein the handling assembly is configured to handle a material to a layered plate at the same height as the handling assembly, or to handle a material out of a layered plate at the same height as the handling assembly; and
   a lift component, configured to drive the handling device to lift relative to the storage shelf so that the handling assembly is at the same height as one layered plate;
   wherein the storage shelf comprises a vertical beam for supporting the layered plate components;
   the layered plate has two ends distributed horizontally, one end of the layered plate is close to the vertical beam and the other end of the layered plate is suspended in the air and away from the vertical beam;
   the layered plate components further comprise a cross beam connected to the vertical beam;
   a side of the layered plate facing away from the mobile chassis is configured to place a material, the cross beam is located on a side of the layered plate facing the mobile chassis, and the cross beam is close to one end of the layered plate; and
   the cross beam is connected to the side of the layered plate facing the mobile chassis by a plate bracket.

2. The handling robot according to claim 1, wherein the mobile chassis comprises a base and a driving wheel component, the driving wheel component comprises:
   a hinge bracket, hinged to the base;
   a driving wheel mounted to the hinge bracket, wherein the driving wheel is rotatable relative to the hinge bracket, to enable the mobile chassis to move; and
   a shock absorber component, wherein one end of the shock absorber component is hinged to the hinge bracket, the other end of the shock absorber component is hinged to the base, the shock absorber component comprises a shock absorber, the shock absorber is configured to reduce vibration transmitted to the base via the hinge bracket.

3. The handling robot according to claim 2, wherein the shock absorber component further comprises an adjusting arm;
   one end of the shock absorber is hinged to the hinge bracket, the other end of the shock absorber is hinged to the base; one end of the adjusting arm is hinged to the other end of the shock absorber; the other end of the adjusting arm is hinged to the base; the adjusting arm abuts against the base so that the adjusting arm is not rotatable toward a first direction relative to the base;

the shock absorber enables the adjusting arm to abut against the base and provides an elastic force to prevent the adjusting arm from rotating toward a second direction relative to the base, the second direction being opposite to the first direction.

4. The handling robot according to claim 3, wherein the adjusting arm is provided with a stop portion, the stop portion is located on a side of the adjusting arm facing the first direction;
the adjusting arm and the shock absorber are provided at a first included angle, and an orientation of opening of the first included angle is in the same direction as the second direction;
when the shock absorber is assembled, the shock absorber and the adjusting arm are provided at a second included angle, an orientation of opening of the second included angle is in the same direction as the first direction, and lengths of two ends of the shock absorber is extensible so that the elastic force provided by the shock absorber is reduced.

5. The handling robot according to claim 1, wherein the handling device further comprises a handling assembly bracket to which the handling assembly is mounted;
the lift component is configured to drive the handling assembly bracket to lift relative to the storage shelf, the handling assembly is rotatable about a vertical direction relative to the handling assembly bracket.

6. The handling robot according to claim 5, wherein the handling device further comprises a rotation driving device;
the rotation driving device comprises a rotation driving motor, a fixed pulley, a handling assembly synchronous belt pulley and a handling assembly synchronous belt;
the fixed pulley is fixedly mounted to the handling assembly bracket, the handling assembly synchronous belt pulley is rotatably mounted to the handling assembly, the handling assembly synchronous belt is connected to the handling assembly synchronous belt pulley and the fixed pulley, and the rotation driving motor is configured to drive the handling assembly synchronous belt pulley to rotate relative to the handling assembly so that the handling assembly rotates about a vertical direction relative to the handling assembly bracket.

7. The handling robot according to claim 6, wherein the fixed pulley is protrudingly provided with a synchronous belt press block on its outer wheel face, and the synchronous belt press block abuts against the handling assembly synchronous belt so that the handling assembly synchronous belt is tensioned;
the handling assembly is provided with a first locking hole and the handling assembly bracket is provided with a second locking hole, a locking pin is simultaneously inserted into the first locking hole and the second locking hole so that the handling assembly is not rotatable about a vertical direction relative to the handling assembly bracket.

8. The handling robot according to claim 1, wherein the layered plate components further comprise a restriction structure;
the restriction structure is configured to block a material located on the layered plate;
the restriction structure is a surrounding plate;
the surrounding plate extends at an edge of the layered plate in a direction away from the mobile chassis.

9. The handling robot according to claim 8, wherein the surrounding plate comprises a surrounding plate main body and a flanging body;
the flanging body extends at an edge of the surrounding plate main body facing away from the layered plate, and the flanging body fits to the surrounding plate main body so that a position where the flanging body is connected to the surrounding plate main body is shaped into an arc transition;
the flanging body and the layered plate are located on the same side of the surrounding plate main body.

10. The handling robot according to claim 8, wherein each layered plate component comprises a plurality of surrounding plates;
an edge of the layered plate has a plurality of side edges, each surrounding plate extends at one side edge of the layered plate, a joint structure provided at a gap between each two adjacent surrounding plates; and
the joint structure is jointed with two adjacent surrounding plates respectively, such that an arc-shaped corner is formed at a corner of the two adjacent surrounding plates.

11. The handling robot according to claim 10, wherein the joint structure has two slots;
side edges of two adjacent surrounding plates are embedded in the two slots, respectively;
the layered plate is fixedly connected to the joint structure by a screw.

12. The handling robot according to claim 1, wherein the vertical beam is detachably connected to the mobile chassis;
the lift component comprises a synchronous belt pulley mechanism and a lift driving motor, the lift driving motor is configured to drive the handling device to lift relative to the storage shelf by the synchronous belt pulley mechanism; and
the synchronous belt pulley mechanism is mounted to the vertical beam.

13. The handling robot according to claim 12, wherein the vertical beam is provided with a mounting slot, and the synchronous belt pulley mechanism is mounted in the mounting slot;
the vertical beam is provided with a vertical guideway, the handling device is provided with a sliding member; and
the sliding member is mounted to the vertical guideway; and
the sliding member is movable along the vertical guideway to enable the handling device to lift relative to the storage shelf.

14. The handling robot according to claim 13, wherein the vertical guideway is communicated with the mounting slot and forms a closed loop; and
a synchronous belt of the synchronous belt pulley mechanism is located in the closed loop and the synchronous belt of the synchronous belt pulley mechanism is connected to the sliding member.

15. The handling robot according to claim 14, wherein the vertical beam is provided with a cushion at an end of the vertical guideway.

16. The handling robot according to claim 15, wherein the cushion protrudes into the vertical guideway and abuts against the synchronous belt of the synchronous belt pulley mechanism;
the cushion is made of a sponge material or a rubber material.

17. The handling robot according to claim 12, wherein the lift component further comprises a braking device;
the braking device comprises a braking disc, a guiding base and a pin;
the braking disc is fixed coaxially with an active belt pulley of the synchronous belt pulley mechanism, the braking disc is provided with one or more pin holes, the guiding base is provided on the vertical beam, the guiding base is provided with a socket, and the pin is inserted into the socket; and the pin is movable along the socket so that one end of the pin is inserted into one of the one or more pin holes and neither the braking disc nor the active belt pulley is rotatable.

18. The handling robot according to claim 17, wherein the braking device further comprises a cam;

the cam is located on a side of the guiding base facing away from the braking disc; the other end of the pin is rotatably connected to the cam, a wheel face of the cam abuts against a side of the guiding base facing away from the braking disc so that the pin is driven to move along the socket when the cam rotates.

19. The handling robot according to claim 18, wherein the braking device further comprises a resilient member;

a middle portion between two ends of the pin is protrudingly provided with a first retaining ring, a wall of the socket is protrudingly provided with a second retaining ring, the resilient member abuts between the first retaining ring and the second retaining ring, the resilient member is configured to enable the cam to abut against the guiding base and provide a pressing force for keeping the pin stationary;

the resilient member is a compression spring; and the compression spring is sheathed on the pin.

* * * * *